UNITED STATES PATENT OFFICE.

JAMES E. MALLORY, OF NEW YORK, N. Y.

WRITING INK AND FLUID.

SPECIFICATION forming part of Letters Patent No. 241,682, dated May 17, 1881.

Application filed November 18, 1880. (Specimens.)

*To all whom it may concern:*

Be it known that I, JAMES E. MALLORY, of the city of New York, State of New York, have invented a certain new and useful Improvement in Writing Inks and Fluids; and I do hereby declare that the following is a full, clear, and exact description of the invention, which will enable others skilled in the art to which it appertains to use the same.

In the manufacture of inks and writing-fluids, particularly such as are made with or contain salts of iron with the extract of galls or gallic and tannic acid, it is necessary to "age" them, as it is termed, for the purpose of developing and fixing the color, so that the ink will be suitable for use. This aging is accomplished by retaining the inks, after they are made, in open tanks or other suitable vessels for from one or two to twelve months, and it is necessary that inks, particularly black inks, should be subjected to this aging treatment before they can be bottled or put in packages for sale. This treatment necessarily increases the cost of manufacturing, and also requires large space for storage tanks or vessels, in which the inks can be retained to become aged. This aging has also been accomplished or sought to be accomplished by driving or passing common atmospheric air through the inks. To secure a sufficient color, so that the ink can be used in a shorter time, coloring-matter—as sulphate of indigo—is frequently added; but even when coloring-matter is used the inks have to be aged for a greater or less time before they are fit for use. The use of such coloring-matter, however, greatly increases the cost of manufacture, and is also injurious to the ink itself, as such coloring-matter always renders the ink liable to fade. No inks or writing-fluids can have a perfect black color and retain such color permanently except those which are made from nut-galls, or their equivalent, and salts of iron.

The object of my invention is to dispense with and render unnecessary all that part of the process of manufacture which has been heretofore found necessary and used for aging inks, and to produce and secure the benefits and advantages derived therefrom in a more thorough manner and in a much shorter time, thereby reducing the cost of manufacture, and rendering the inks, as soon as made, as suitable and fit for use as they now are after having been kept for months to become aged, or having been aged by passing common air through them, and also to wholly dispense with the use of coloring-matter, thereby not only saving the expense of such coloring-matter, but at the same time producing a much better article of ink for use. This result I obtain and secure by subjecting the fluid, after the ingredients have been properly mixed, to the action of pure oxygen gas, which may be forced through the fluid by any suitable apparatus or mingled therewith by any of the processes usually used for aerating fluids or by spraying the ink into a vessel filled with the oxygen gas. The peculiar mode or means of applying the oxygen gas to or causing it to mingle with the fluid is immaterial; but the desired effect will be produced most effectually and in the shortest time by the use of such means or device as will soonest bring the gas into most intimate contact with every portion of the fluid.

For the production of black ink no ingredients are necessary other than the extract of galls or gallic and tannic acid and the salts of iron and gum, with the required quantity of water, and these ingredients may be mixed in any of the proportions used for such inks. If this solution or mixture is subjected for but a few minutes to the action of oxygen gas it is found that the color will be changed to a perfect and permanent black, and the fluid is thereby rendered suitable and fit for immediate use as a writing-ink.

The application of oxygen gas to fluid inks in the manner specified not only gives to them the desired black or deep color in a very short space of time as compared with the time required for aging inks by the ordinary methods, but also accomplishes the desired result in a much more complete and perfect manner, as all portions of the fluid are subjected to the action of the oxygen gas, and thus renders the color of the ink blacker or deeper than can be effected by any of the known ordinary processes of aging inks.

By the use of oxygen gas in the manner specified inks can be manufactured in any quantities, as desired, and at much less expense than when made according to the ordinary methods. Such inks are also ready for immediate use, and will have when first used a black and deep color and one not changing thereafter.

What is claimed is—

1. The process of manufacturing inks or writing-fluids composed of the extract of galls or gallic and tannic acid and salts of iron and gum, by subjecting them to the action of pure oxgen gas, as and for the purposes mentioned.

2. An ink or writing-fluid composed of the extract of nut-galls or gallic and tannic acids and salts of iron and gum subjected to the action of pure oxygen gas, as herein set forth.

JAMES E. MALLORY.

Witnesses:
S. NELSON WHITE,
SAMUEL LEA.